United States Patent

Pence

[15] 3,703,101
[45] Nov. 21, 1972

[54] APPARATUS FOR SENSITIVE MEASUREMENT AND RECORDING OF PHYSIOLOGICAL ACTIVITY

[72] Inventor: Roy J. Pence, Los Angeles, Calif.
[73] Assignee: The Regents of the University of California, Berkeley, Calif.
[22] Filed: Dec. 14, 1970
[21] Appl. No.: 97,617

[52] U.S. Cl. ................................73/432 R, 128/2 N
[51] Int. Cl. .............................................A61b 10/00
[58] Field of Search .......73/432 R, 432 SD; 128/2 R, 128/2 N

[56] References Cited

UNITED STATES PATENTS 1,827,530   10/1931   Le Grand........73/432 SD UX

FOREIGN PATENTS OR APPLICATIONS 650,542   2/1951   Great Britain..............128/2 N Primary Examiner—Louis R. Prince
Assistant Examiner—Joseph W. Roskos
Attorney—Miketta, Glenny, Poms & Smith

[57] ABSTRACT

An apparatus for sensitive measurement and recording of the responses and activity in a biological specimen useful for the toxicological and pharmacological investigation of drugs, chemicals and gaseous environments. The apparatus includes an environmental chamber in which a biological specimen is stereotaxically mounted for positioning in selectable engagement with the probe of a piezoelectric transducer. The atmosphere within the chamber may be controlled to provide a particular gas within the chamber such as a contaminated or polluted air environment. The physiological activity or responses of a specimen to a selected gas or to manually administered drugs or chemicals are measured by the transducing device. The signal is then suitably amplified, filtered, processed and controlled to provide a visual or auditory recording of the processed signal.

3 Claims, 3 Drawing Figures

PATENTED NOV 21 1972

3,703,101

INVENTOR.
ROY J. PENCE
BY
Miketta, Glenny, Poms & Smith
ATTORNEYS.

APPARATUS FOR SENSITIVE MEASUREMENT AND RECORDING OF PHYSIOLOGICAL ACTIVITY

BACKGROUND AND PRIOR ART

At a time of increased social consciousness of environmental problems, a corresponding increase has arisen in the need for new methods and tools of basic research on physiological responses of organisms for external sources. The study of the interaction between atmospheric pollution and biological systems has resulted in a closer relationship between the entomological and toxicological disciplines. Simultaneous with the advent of growth in ecological concern there has appeared an increased interest by medical, pharmaceutical and governmental bodies in the biological effects of the use, and abuse, of drugs, pesticides, and the like. This area of social anxiety has also placed further burdens on the efforts to develop more effective research tools and techniques in the fields of physiology and pharmacology.

In response to these demands, investigations have been made regarding the physiological similarities between insects and higher organisms which involves the measurement of physiological activity of a simple biological system. It has been found that regardless of the morphological differences between insects and higher animals, there are biological and physiological similarities which make the insects suitable for testing, particularly in view of their short life cycle and natural abundance. One nearly ideal bio-assay system for study is the excised honeybee abdomen. Such abdomens, selected so as to have empty crops, may be carefully severed from the thorax, at the pedicel, when the living bees have been anesthetized with $CO_2$ gas. The resulting specimen will constitute an unstressed biological system maintaining steady pulsitive activity for at least 24 hours. The abdomen is highly responsive to airborne molecules or injections (through the alimentary canal which is simultaneously bathed externally by hemolymph containing the same substance). Airborne molecules have been found to rapidly enter the spiracles and tracheae of the respiratory system and then into the blood. All routes of administration immediately trigger neuromuscular response.

Having found the extreme sensitivity and responsiveness of the excised honeybee abdomen to its ambient environment or to chemical or drug administrations, it became apparent that suitable equipment would be required to measure and record the precise nature of this physiological activity. Two interrelated problems became immediately apparent. First, a high sensitive sensing system would be required, probably involving equally sensitive electromechanical transduction amplification and recording. Second, an appropriate chamber would be needed to isolate the specimen from undesirable sounds, vibrations, gases, temperature changes, etc. Only through the integration of these desideratum could a successful interface between the biological system and the data acquisition system be accomplished.

SUMMARY OF THE INVENTION

It is therefore an object of the present invention to provide electro-mechanical means for sensitive measurement and recording of the physiological activity of a biological system stimulated by substances which may be airborne or injected to produce a response therein. It is another object of the present invention to provide a sensing and measuring means for acquiring data regarding a biological specimen and including means for isolating such specimen from a plurality of uncontrolled variables, including temperature, changes in the gaseous environment in which the specimen is maintained, variation in acoustical level, etc. It is a more particular object of the present invention to provide electro-mechanical transducing means for sensing physiological changes in a bio-assay system, amplifying the resultant signals, selecting the particular signal frequencies desired, processing such signals, and recording such signal through audio or visual means while such bio-assay system is maintained in a controlled environment.

It is still a further object of the present invention to provide a system as last described in which the specimen may be precisely and manually positioned in relation to the transducing means, in which the environment for the specimen may be varied (such as through the provision of pollutants to create a contaminated environment) and in which the transducer may be isolated from extraneous vibrations and acoustical noises.

Generally stated, the apparatus for sensitive measurement and recording of physiological activity in a biological specimen of the present invention includes means for maintaining a controlled environment in which the specimen may be mounted, means for stereotaxically mounting the specimen, transducing means mounted so as to minimize vibration, electrical means for amplifying and filtering signals produced by the transducing means to permit selection of desired signal frequency components, and means for recording the physiological activity of the specimen represented by the electrical signals.

DETAILED DESCRIPTION

Figure 1:
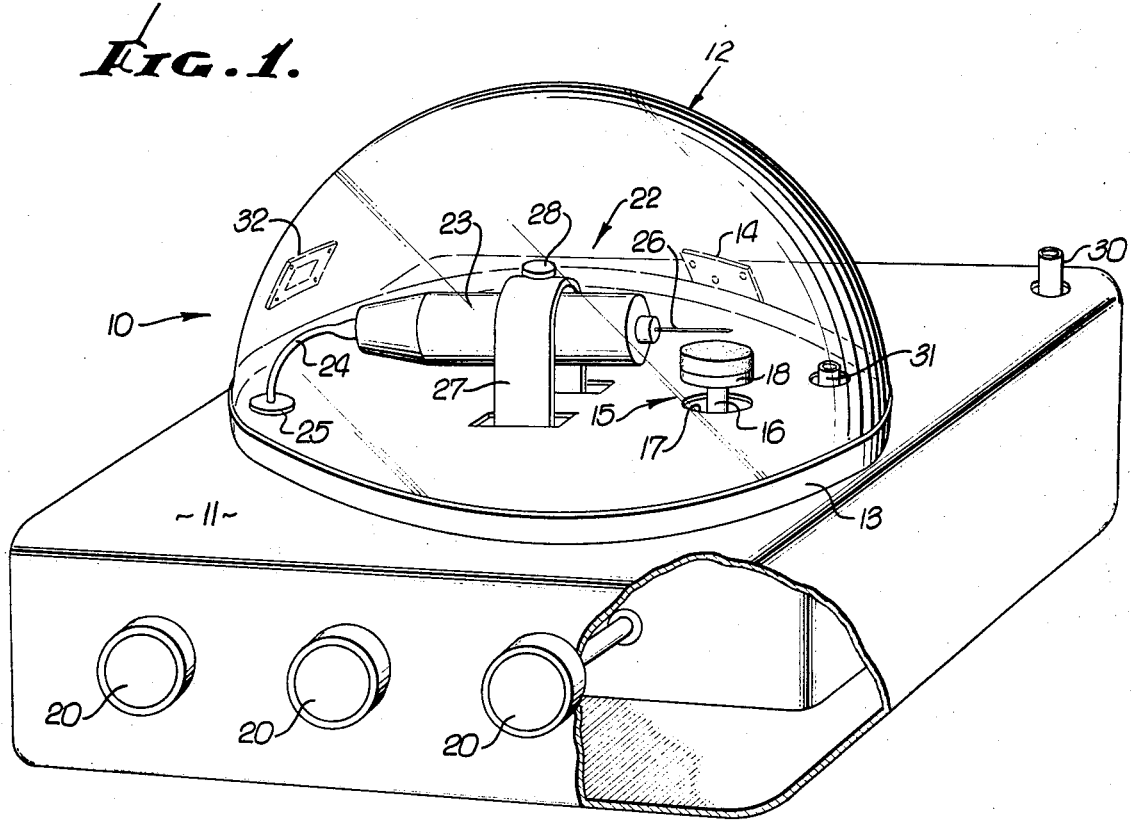
FIG. 1 is a perspective view of an exemplary environmental chamber constructed in accordance with the present invention.
Figure 2:
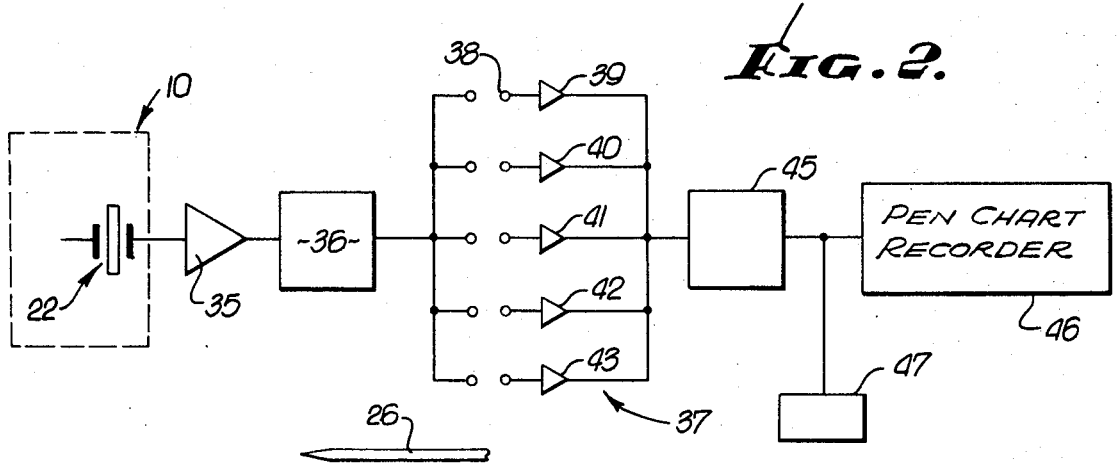
FIG. 2 is a schematic electrical diagram of the apparatus for measuring and recording physiological activity of biological specimens.

Referring now to the drawings, there is shown in FIG. 1 an exemplary apparatus for sensitive measurement and recording of physiological activity of a biological specimen which includes an environmental chamber 10 as seen from FIG. 1 and which is illustrated diagrammatically in FIG. 2. Such environmental chamber includes means for maintaining a controlled environment in which the specimen may be mounted including base 11 and a glass or plastic hemispherical cover 12 which is mounted above the base 11 and is in sealing contact therewith through a sealing strip 13 to form a hermetically sealed chamber in which a specimen may be mounted. It will of course be understood that the particular shape of the environmental chamber is not critical to the present invention nor is a transparent material necessary for the housing although visual observation of the specimen and the chamber components is desirable. It is also desirable to form the cover of material which will isolate the interior of the chamber from external undesirable noises and vibrations. The cover 12 is mounted to the housing 11 through a conventional hinge 14 which provides access to the interior of the environmental chamber. Through the provision of the acoustically and atmospherically isolated region, the measuring and recording of the physiological activity of the specimen under consideration is greatly enhanced.

Figure 3:
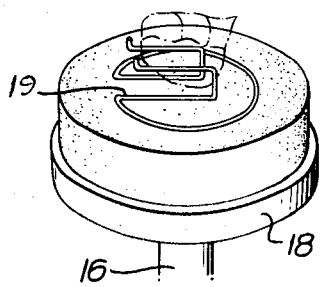
FIG. 3 is an enlarged elevation view of the means for supporting the biological specimen during operation of the apparatus.

The apparatus also includes means 15 in the environmental chamber for stereotaxic mounting of the specimen within the controlled environment. Such means, in the exemplary embodiment, comprises a vertically disposed pedestal 16 which passes through an opening 17 in the upper wall of housing 11 so as to project within the acoustically and atmospherically sealed chamber. A support plate or member 18 is mounted at the upper end of the pedestal 16 for direct support of the biological system being tested. As seen in FIG. 3, the support plate 18 may be provided with a wire specimen holder 19 that may be shaped for proper positioning of various types of specimens. The lower end of the pedestal 16 is connected to means for moving the pedestal in three planes through the manipulation of control knobs 20 which pass through suitable openings in the side-walls of the housing 11. The knob shafts are connected through gears or the like to the base of the pedestal in a manner well known in the art for rotating the support member 18 and moving it up and down, forward and backward, or to the left and right. The means will thus be seen to allow precise positioning and movement of the specimen through manual manipulation completely exteriorly of the chamber.

The apparatus also includes electro-mechanical transducing means 22 of conventional construction including a body 23 connected through suitable lead wires 24 at the rear end thereof to the electrical means to be described hereinafter, such wires passing through a sealing grommet 25 secured in the upper wall of the housing 11. The forward end of the transducing means, which may be of the piezoelectric type, supports a needle-like, thin, elongated, metal rod or probe 26 for engagement with the biological specimen. As is well known in the art, the probe 26 may be extremely sensitive to mechanical movement of its free end and through the piezoelectric crystal may transduce such mechanical movement into electrical signals. The transducer body 23 is supported by an inverted U-shaped support member carried by the upper wall of the housing and supporting the transducer body in fixed position. The support 27 minimizes the transmission of vibrations from the housing to the transducer pickup probe 26 through the provision of suitable damping members which may include elastomeric mounting pads such as is shown at 28.

The apparatus for maintaining a controlled environment may additionally include means for introducing a selected gas into the environmental chamber. Such means, in the exemplary embodiment, may include an inlet pipe 30, the free end of which projects above the top wall of housing 11 and an outlet tube 31 which projects upwardly through an opening in the top wall of the housing into the chamber enclosed by the cover 12. A suitable valve (not shown) may be mounted between the inlet and outlet tubes within housing 11 and may be a conventional one-way valve. The gas to be introduced into the enclosed chamber may be contained in any pressurized source suitable for storing such gas and preferably having a rubber outlet tube the free end of which may be forcibly fit over the free end of the inlet tube 30 so that the pressurized gas source may force the gas into the specimen chamber. To prevent overpressurization of the chamber, there may be provided a one-way flapper-type valve 32 mounted in cover 12.

Referring now more particularly to FIG. 2, there is diagrammatically illustrated electrical means for transmitting and processing the signals produced by the electro-mechanical transducer and electro-mechanical recording means to facilitate the sensitive measurement of biological activity and to precisely record such measurements. More specifically, the exemplary embodiment of such means includes electrical means 35 for amplifying signals produced by the transducer 22. The details of such electrical amplification device need not be further discussed since such device may be of conventional commercial construction the characteristics of which will be well known to those having ordinary skill in the art. The apparatus also includes low-noise signal frequency bandpass means 36 for selection of desired signal frequency components as required for analysis of the physiological activity. Such bandpass filter may be of conventional construction.

The apparatus also includes means indicated generally at 37 for processing the signal produced by the piezoelectric device. Such processing means may include a plurality of switches 38 for passing the signal through one or more of several electrical circuits such as a multiplication circuit 39, a differentiation circuit 40, a combined multiplication and differentiation circuit 41, an integration circuit 42, and a combined multiplication and integration circuit 43. It will be apparent to those having skill in the art that such circuits are only exemplary of the electrical circuits which may be provided to process the signal to obtain a desired signal output for recording. Details of such circuits are not given herein inasmuch as such circuits are conventional and well known in the art.

The processed output signal is passed to a signal amplitude control device 45 for selecting a desired amplitude of the process signal to be recorded. Such control device is manually operable and may be controlled by a foot pedal or the like to facilitate operation of the entire apparatus. The output of the control device is passed to recording means which may comprise one or more readout devices such as a permanent visual readout device in the form of a pen chart recorder 46 of standard and conventional construction. Alternatively, or additionally, the output signal may be fed to a pair of earphones indicated at 47 for auditory recording of the specimen activity, or to a voltmeter device.

It should also be understood that a second, parallel electro-mechanical means may be provided for transmitting, processing and recording the electrical signal after amplification so as to provide simultaneous dual recording of two different selected functions of physiological activity of the specimen. Such dual electro-mechanical path will include an additional signal processing unit such as that shown at 47 and a level control device such as that shown at 45 and the incorporation of a pen chart recorder having two independently activated pen devices.

The apparatus may also be provided with a thermistor element mounted in the chamber for precision sensing of temperature and through the means of a conventional bridge circuit displayed on a panel for observation. The apparatus may also include means for illuminating the specimen and for optical magnification of the specimen to permit viewing by the operator during experimental tests.

In operation, the cover 12 is lifted to provide access to the specimen holder and a suitable specimen such as the abdomen of a honeybee may be mounted on the holder for testing. The cover may then be closed and a suitable atmosphere may be created within the chamber as required for the particular study. Through the manual control knobs 20, the pedestal may be positioned as desired so as to move the specimen into contact with the electro-mechanical transducer probe 26. Such positioning device will assure repeatable positioning in drug-chemical experiments where the relationship between the probe and the specimen must be consistently maintained in repetitive experiments to provide a common basis for evaluation. Where drug-chemical experiments are conducted, the substance may be hand administered to the specimen after it is appropriately mounted and before closing the cover 12.

After the specimen and probe are positioned and the desired chemical or drug substance is administered or a sample gas environment is created within the chamber, the signals produced by the transducing device will be amplified and subsequently processed as desired by the operator. Various components of the complex signal may be viewed and recorded at the same time including duplication and inversion. Moreover, the chart recorder may be two-speed permitting further flexibility in the manner in which the signals are recorded for evaluation.

The apparatus has been demonstrated for use in testing the reaction and fate of classical depressants and stimulants, for the determination of cyclic rhythms in individual organs of unstressed honeybee abdomens, and for the qualitative and/or quantitative evaluation of drug substances as well as the physiological responses to dissolved contaminants in polluted air and water. Thus, the exemplary device herein described will be seen to accomplish the objects as previously set forth for providing a sensitive measuring and recording device to determine the physiological activity and responses in a biological specimen. While the foregoing detailed description has been made with reference to an exemplary embodiment of such an apparatus in accordance with the present invention, it should be noted that other embodiments and variations, modifications and alterations thereof may be made within the scope of the present invention.

I claim:

1. In an apparatus for sensitive measuring and recording of the physiological activity of a biological specimen mounted in an atmospherically and acoustically sealed chamber on a manually positionable pedestal and in engagement with a fixedly mounted piezoelectric probe, the improvement comprising:
   electro-mechanical means for transmitting, processing and recording signals produced by the probe due to the physiological activity of said specimen including, signal amplification means, low-noise bandpass filter means, means for processing the signal by selective multiplication, integration or differentiation of the signal, and means for recording a selected function of physiological activity of the specimen.

2. The improvement of claim 1 wherein including a second parallel electro-mechanical means for transmitting, processing and recording the signal after amplification to provide simultaneous dual recording of two different selected functions of physiological activity of the specimen.

3. An apparatus for sensitive measurement and recording of physiological activity and responses in a biological specimen stimulated by controlled sources comprising:
   means for maintaining a controlled environment including the chemical composition of the gas in which the specimen is mounted;
   electro-mechanical transducing means responsive to the physiological activity of said specimen including means for fixedly supporting said transducing means within said environment and so as to minimize vibration thereof;
   stereotaxic mounting means for said specimen within said controlled environment including means exterior of said environment for manually controlling the precise position of a selected portion of said specimen in engagement with said transducing means;
   electrical means for amplifying signals produced by said electro-mechanical transducing means;
   electrical signal frequency bandpass means for selection of desired signal frequency components; and
   means for recording the physiological activity and response of the specimen represented by said signal.

* * * * *